United States Patent [19]
Iwaki et al.

[11] Patent Number: 5,168,383
[45] Date of Patent: Dec. 1, 1992

[54] LIQUID CRYSTAL DEVICE WITH FABRY-PEROT ETALON

[75] Inventors: Tadao Iwaki; Hiroshi Kuroda; Junko Yamanaka, all of Tokyo, Japan

[73] Assignee: Seiko Instruments Inc., Japan

[21] Appl. No.: 443,717

[22] Filed: Nov. 29, 1989

[30] Foreign Application Priority Data

Nov. 29, 1988 [JP] Japan .................. 63-302020

[51] Int. Cl.$^5$ .............................................. G02F 1/13
[52] U.S. Cl. ............................... 359/71; 359/56; 359/104; 359/260
[58] Field of Search .............. 359/54, 62, 71, 75, 359/79, 104, 106, 260

[56] References Cited

U.S. PATENT DOCUMENTS

| | | | |
|---|---|---|---|
| 3,846,014 | 11/1974 | Aldrich et al. | 350/338 |
| 3,910,681 | 10/1975 | Elliott et al. | 350/338 |
| 4,012,119 | 3/1977 | Adams et al. | 359/71 |
| 4,448,491 | 5/1984 | Okubo | 350/344 |
| 4,696,548 | 9/1987 | Uneo et al. | 359/84 |
| 4,714,323 | 12/1987 | Katagiri et al. | 350/350 S |
| 4,790,634 | 12/1988 | Miller et al. | 359/71 |
| 4,925,276 | 5/1990 | McMurray, Jr. et al. | 350/334 |

FOREIGN PATENT DOCUMENTS

| | | |
|---|---|---|
| 0260073 | 3/1988 | European Pat. Off. |
| 3148427 | 6/1983 | Fed. Rep. of Germany |
| 0052618 | 3/1983 | Japan .................. 350/339 R |

OTHER PUBLICATIONS

Chang et al, "Lower power laser-address liquid crystal projection display device", vol. 24, No. 3, Aug. 1981 IBM Technical Disclosure Bulletin.

G. L. Gladstone and V. Sadagopan, Liquid crystal Display Device, IBM Technical Disclosure Bulletin, vol. 14, No. 5, Oct., 1971.

Soviet Physics Doklady, vol. 31, No. 4, Apr., 1986, pp. 319-321, Y. D. Dumarevskii et al.: "Optical control of the spatial modulation of light in liquid-crystal interferometer".

Primary Examiner—William Mintel
Assistant Examiner—Tan Ho
Attorney, Agent, or Firm—Bruce L. Adams; Van C. Wilks

[57] ABSTRACT

The liquid crystal device has a pair of flat glass substrates, a pair of dielectric multilayer film mirror, a plurality of transparent electrodes arranged in a matrix, a plurality of minute insulating films formed on inner face of the glass substrates, and a liquid crystal layer. A pair of dielectric multilayer film mirror constitute a Fabry-Perot etalon via the liquid crystal layer and enhance a contrast ratio. The minute insulating films are formed by physical vapor deposition and attain a uniform thickness, so that a liquid crystal device having a uniform cell gap is obtained.

19 Claims, 3 Drawing Sheets

LIQUID CRYSTAL DEVICE WITH FABRY-PEROT ETALON

BACKGROUND OF THE INVENTION

1. Field of the Invention

The present invention relates to a liquid crystal spatial light modulator for electrically modulating a laser beam.

2. Description of the Prior Art

As a liquid crystal device capable of electrically modulating a laser beam, liquid crystal displays used for liquid crystal televisions have heretofore been employed experimentally very often.

However, the resolution offered by any one of the conventional liquid crystal devices, which have been employed mainly for liquid crystal televisions, remains as low as 2-2.5 l p/mm. Consequently, those conventional liquid crystal devices have failed to answer the requirements including 10-100 l p/mm in resolution necessary for optical data processing. Moreover, the contrast ratio is as low as 1/5-1/20, so that it can not meet those requirements including 1/100-1/1000 in contrast necessary for optical data processing. In the case of the conventional liquid crystal device, when analog optical data processing is performed, the wavefront distortion after laser beam modulation becomes greater because of the inferior flatness of the substrate. As a result, the wavefront needs correcting, using matching oil, a phase conjugation wave or the like.

SUMMARY OF THE PRESENT INVENTION

An object of the present invention is to provide the liquid crystal device which meets the requirements of a high-contrast necessary for optical data processing.

Another object of the present invention is to provide a liquid crystal device which meets the requirements of a high-resolution necessary for optical data processing.

Still another object of the present invention is to provide the liquid crystal device utilizing in spatial light modulator in which the wavefront distortion is extremely low after light modulation.

To realize the above objects, the liquid crystal device of the present invention has a pair of glass substrates having a flatness of 0.05 μm and less, dielectric multilayer film mirrors having a reflectivity of 50% and over, a plurality of transparent electrodes being arranged in a matrix, a plurality of metal electrodes connecting a row of the transparent electrodes, a pair of alignment layers, insulating films, and a liquid crystal.

The glass substrates have the flatness of 0.05 μm and less, so that the contrast of the liquid crystal device becomes even in the display area.

The pair of the dielectric multilayer film mirrors formed on the inner face of the glass substrates constitute a Fabry-Perot etalon via the liquid crystal and enhance a contrast ratio. The metal electrode is able to supply each of the transparent electrodes with electric signals efficiently and each of the transparent electrodes has a junction electrode and a picture element electrode, so that the electric signal is applied to the liquid crystal area of a picture element efficiently and the liquid crystal device attains a high-resolution. The insulating films are arranged in matrix and control a gap between the glass substrates uniformly.

DESCRIPTION OF THE PREFERRED EMBODIMENTS

Now the present invention will be explained in detail with reference of the embodiments thereof shown in the attached drawings.

Figure 1:
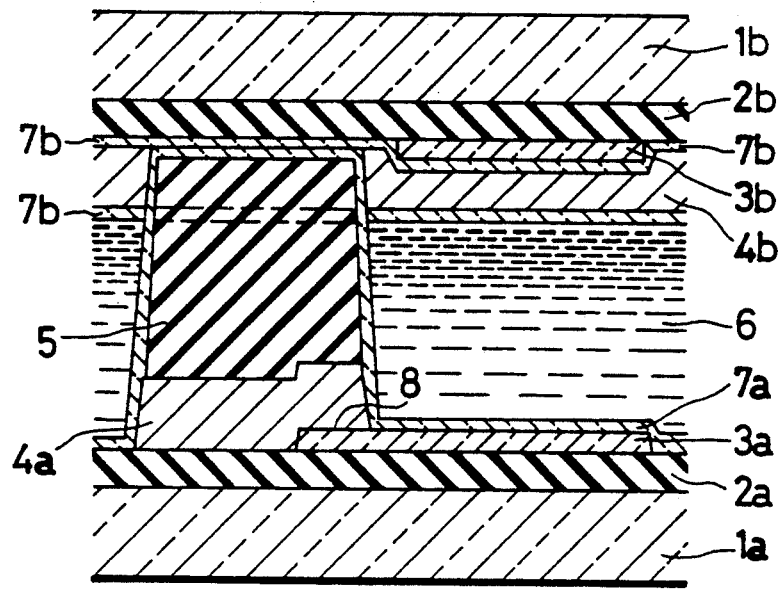
FIG. 1 is a partly diagrammatic sectional view of an electrode structure of a liquid crystal device of the present invention.
Figure 2:
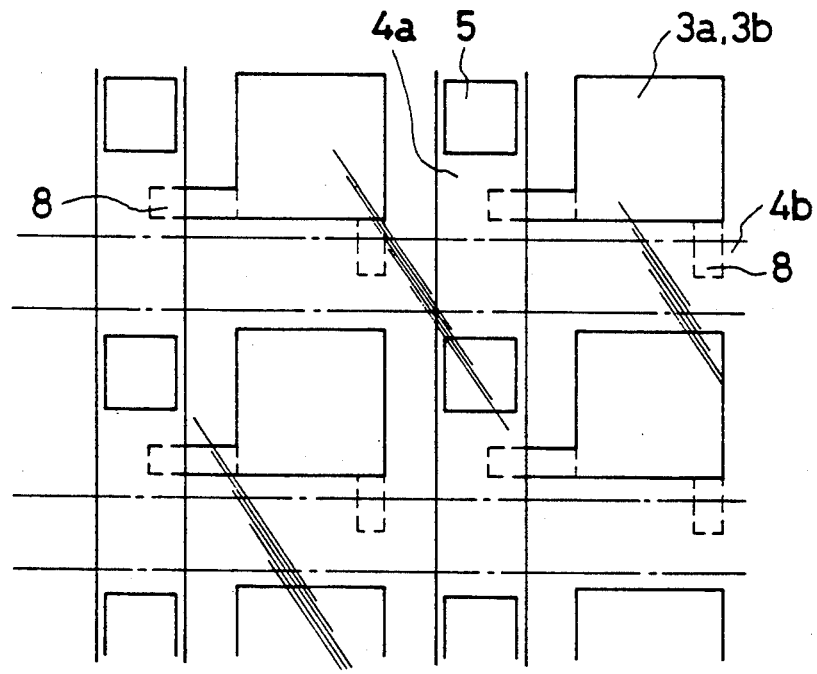
FIG. 2 is a partly top view of an electrode structure of the liquid crystal device of the present invention.

FIG. 1 and FIG. 2 are a partly diagrammatic sectional view and a partly top view of an electrode structure of a liquid crystal device embodying the present invention.

The liquid crystal device is formed by injecting a liquid crystal 6 between the glass substrates 1a, 1b which are arranged oposite each pair of transparent electrodes 3a, 3b.

A glass substrate 1b is formed on its inner face sequentially with a dielectric multilayer film mirror 2b, transparent electrodes 3b, metal electrodes 4b, and a SiO film 7b.

A glass substrate 1a is formed on its inner face sequentially with a dielectric multilayer film mirror 2a, transparent electrodes 3a, metal electrodes 4a, insulating films 5, and a SiO films 7a.

The transparent electrodes 3a, 3b are arranged in a matrix, and each of the transparent electrodes 3a, 3b has a junction electrode 8 and a picture element or pixel electrode.

The metal electrodes 4a are arranged in columns (or rows) and each of the metal electrodes 4a is connected to a row of the transparent electrodes 3a through the junction electrodes 8.

The metal electrodes 4b are arranged in rows, or columns and each of the metal electrodes 4b is connected to a row of the transparent electrodes 3b through the junction electrodes 8.

The metal electrodes 4a, 4b intersect at right angles as illustrated in FIG. 2, each point of intersection defining a cross-over point corresponding to one pixel or picture element.

The insulating films 5 are arranged in matrix on the metal electrodes 4a of the glass substrate 1a, and control a gap between the glass substrates 1a, 1b.

The glass substrates 1a, 1b may be made of ordinary glass material such as soda glass and borosilicate glass, optical glass such as flint glass and crown glass, or quartz glass. Optical glass known as BK7 was used in this embodiment. The flatness of the glass substrate was set at not greater than 0.05 μm within a data display area. When the flatness of the glass substrate was set at greater than 0.05 μm in visible light, the contrast of the liquid crystal device according to the present invention was seen to become conspicuously uneven. A flatness of not greater than 0.05 μm is therefore preferred. When the wavelength of light for use in processing optical data is relatively long as in the case of near infrared light, unevenness in contrast tends to become less even though the value of the flatness is as large as approximately 0.1 μm.

Each of the dielectric multilayer film mirrors 2a, 2b was prepared by alternately forming two or three kinds of dielectric thin films having different refractive indexes by vacuum deposition. An $[HL]_N$ H/glass substrate has a well-known dielectric multilayer film mirror structure, where $H=\lambda/4$ film of high refractive material, $L=\lambda/4$ film of low refractive material (however, $\lambda$=wavelength of a laser beam for use) and N=integer not smaller than 4). $[HL]_N$ in this case means the [HL] structure is repeated N times. In the embodiment shown, $TiO_2$ was used as H and $SiO_2$ as L with $5 \leq N \leq 10$ and $\lambda$=488 nm. ZnS, $ZrO_2$, $Y_2O_3$, SiO, Si, etc. other than $TiO_2$ may be used as H, whereas $MgF_2$, cryolite, etc. other than $SiO_2$ may be used as L. The transparent electrodes 3a, 3b, which are ITO electrodes as thick as approximately 1,200 Å, were formed by vacuum deposition. Sputtering may be used for the formation of the ITO electrodes. Moreover, any value ranging from 200-2000 Å may be selected optionally as the film thickness of the ITO electrode provides desired electrical characteristics are available, though it is dependent on film forming conditions.

The metal electrodes 4a, 4b, which has thickness of 1,800-2,500 Å, were formed by sputtering Mo, Cr, Al, Cu, W, Au/Cr, etc.; the film width was set at 5-10 μm.

The insulating film 5, which has thickness of 1.5-6.0 μm, was formed by sputtering $SiN_x$ (x=0.8-1.3), $Ta_2O_5$ or $SiO_2$ on the metal electrode 4.

The SiO films 7a, 7b are the layers to align the liquid crystal 6, and were formed by oblique deposition in a direction parallel to the row of the metal electrodes and in an angular direction of 58 to 64 degrees relative to the normal of the substrate.

A TN liquid crystal was employed in this embodiment, though a ferroelectric liquid crystal may also be usable.

The insulating films 5 are formed by physical vapor deposition (i.e., sputtering, vapor deposition and ion plating), so that the thickness of the insulating films 5 become equal extremely in the whole substrate. In case of the liquid crystal device having a minute gap of 1.5~6.0 μm, using the insulating films formed by physical vapor deposition is important to making a uniform gap. Although as many insulating films 5 as transparent electrodes 3a, 3b are disposed in FIG. 2, it is rather preferred to dispose less insulating films than transparent electrodes. The insulating films 5 should preferably be disposed with a patterned space of 100~1,000 μm. The trains of the metal electrodes 4a, 4b formed on both glass substrates 1a, 1b should intersect at right angles, so that the positioning of the electrodes is facilitated and besides the liquid crystal device including the lead-out electrode sections is made compact. The dimensions of the insulating film 5 was made (5~10 μm)×(5~10 μm).

Figure 3:
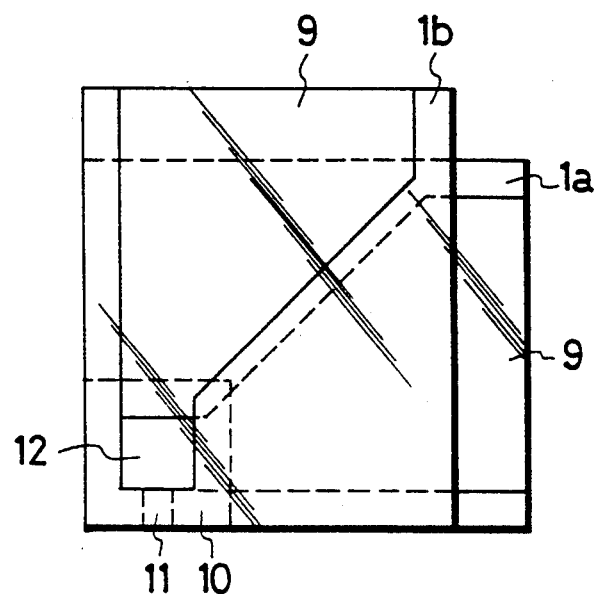
FIG. 3 is an overall block diagram of the liquid crystal device of the present invention.

FIG. 3 is an overall block diagram of the liquid crystal device comprising lead-out electrode sections 9, a liquid crystal sealing section 10, a liquid crystal injection opening 11 and a display area 12.

The liquid crystal sealing section 10 is filled with an epoxy adhesive in order to fix the glass substrates 1a, 1b with the insides of their respective electrode sections being set opposite to each other. The liquid crystal injection opening 11 is the gap used to inject the liquid crystal material into the display area 12, and is sealed with epoxy resin after the liquid crystal material has been injected. The display area 12 is provided with the electrode structure shown in FIGS. 1, 2. The lead-out electrodes for supplying the metal electrodes 4a, 4b with liquid crystal driving voltage are disposed. The gap between electrodes in the lead-out electrode sections 9 has been increased to 200~1,000 μm, because the gap between the electrodes in the display area 12 is as narrow as 10~20 μm and an external signal line cannot be connected thereto.

The operational characteristics of the liquid crystal device according to the present invention will subsequently be described.

Figure 4:
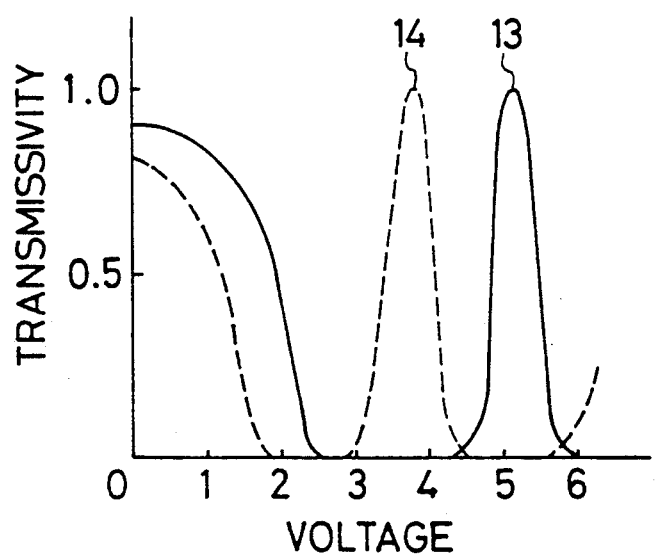
FIG. 4 is a graph showing the relation between the driving voltage and the transmissivity in the liquid crystal device of the present invention.

FIG. 4 is a graph showing the relation between driving voltage and transmissivity in the liquid crystal device according to the present invention. Curves 13 and 14 represent characteristics with the thickness of the insulating film 5 of FIG. 1 set at 1.5 μm and 2.5 μm, respectively. The transmissivity of FIG. 4 represents the characteristics measured using an argon laser beam having a wavelength of 488 nm. The liquid crystal device according to the present invention is seen to indicate characteristics far different from those of an ordinary liquid crystal device and its transmissivity is also seen to have a sharp peak relative to a particular driving voltage. Moreover, the position relative to the peak driving voltage varies with the thickness of the insulating films shown in FIG. 1, and slightly varies with the liquid crystal device assembling conditions even when the thickness of the insulating films is the same. Further, the peak position varies with the wavelength of light for use. In the liquid crystal device according to the present invention, the operational driving voltage area is determined after the liquid crystal device characteristics are evaluated one after another. The liquid crystal device having the characteristics represented by the curve 13 of FIG. 4, for instance, is driven by applying a driving voltage of 3.5 V while it is held off and 5.2 V while it is held on. The contrast ratio of the liquid crystal device thus set obtains a value as extremely high as 1:150~1:1,800.

In a case using a ferroelectric liquid crystal as the liquid crystal material, the SiO films 7a, 7b are formed by oblique deposition in an angular direction of 80 degrees relative to the normal of the substrate, the insulating films 5 are formed by sputtering $SiO_2$ and its thickness is 2.0 μm. As results, the liquid crystal device attains a contrast ratio of 1:300~1:2000.

The ferroelectric liquid crystal composition may be composed of mixture of ester type SmC liquid crystal materials added with optically active material. For example, the mixture is comprised of 4-((4'-octyl) phenyl) benzoic acid (3''-fluoro, 4''-octyloxy) phenyl ester:

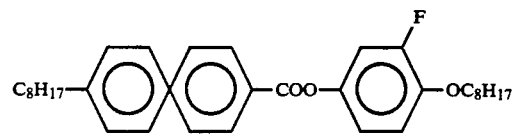

and 4-((4'-octyloxy) phenyl) benzoic acid (3''-fluoro, 4''-octyloxy) phenyl ester:

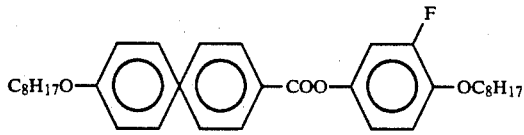

at the ratio of 1:1. The optically active material may be composed of 5-octyloxynaphthalene carboxylic acid 1'-cyanoethyl ester:

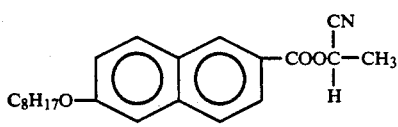

which is added to the mixture by weight of 25% to form the ferroelectric liquid crystal composition.

Figure 5:
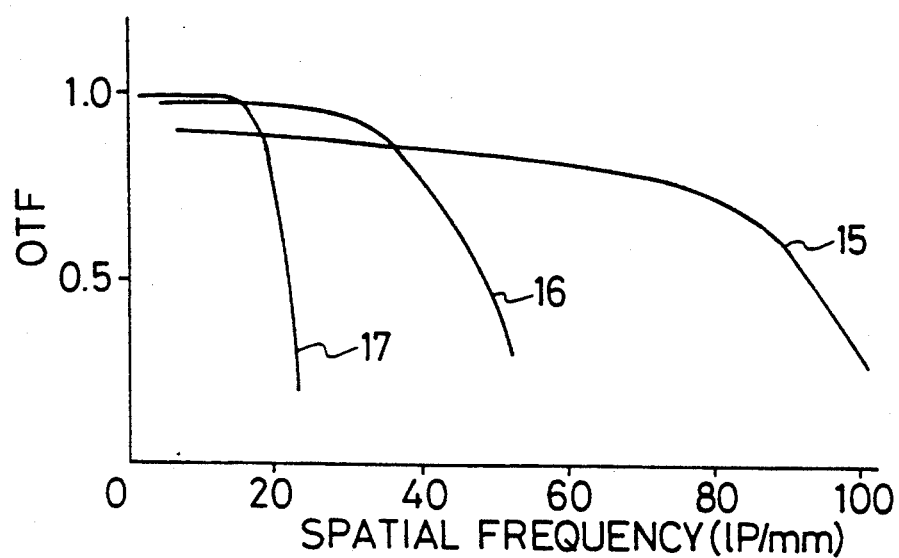
FIG. 5 is a graph illustrating the resolution characteristics of the liquid crystal device according to the present invention.

The resolution of the liquid crystal device according to the present invention will subsequently be described. The resolution was evaluated by feeding a resolution test chart to the liquid crystal device and evaluating the OTF (optical Transfer Function). FIG. 5 is a graph illustrating the resolution characteristics of the liquid crystal device according to the present invention, wherein the spatial frequency of the resolution test chart is indicated on the abscissa axis, whereas the OTF is indicated on the ordinate axis. In FIG. 5, curves 15, 16 and 17 represent characteristics when 5 $\mu m \times 5$ $\mu m$, 10 $\mu m \times 10$ $\mu m$ and 20 $\mu m \times 20$ $\mu m$ transparent electrodes are used, respectively. Incidentally, the wavelength of light used for the evaluation of the resolution was 488 nm. As shown in FIG. 5, the resolution of the liquid crystal device according to the present invention is seen to sharply increase as the size of the transparent electrode was made smaller. Moreover, the good contrast ratio of the liquid crystal device prevented the OTF from drastically decreasing even when the size of the transparent electrode was decreased. In this way, the liquid crystal device according to the present invention was seen to have resolution of 20 l p/mm ~ 100 l p/mm.

A description will subsequently be given of the relation between the flatness of the glass substrate used for the liquid crystal device according to the present invention and the wavefront distortion. Since the liquid crystal spatial light modulator is generally designed for use in controlling the wavefront of optical data having good coherence very often, the distorting of the wavefront of the light passed through the liquid crystal spatial light modulator has to be removed as it greatly impairs the performance of optical operations. The present inventor calculated differences between images using the liquid crystal device according to the present invention. As a result, it was found that the flatness of a glass substrate had to be not greater than 0.05 $\mu m$ in order to carry out uniform calculation of the differences over the whole display area of the liquid crystal device.

Although light of 488 nm employed for the evaluation of the flatness of the glass substrate, the flatness to a glass substrate may have an inferior value when a laser beam source such as an He-Ne laser, a YAG laser or a semiconductor laser having a wavelength longer than 488 nm is employed. Although the flatness of the glass substrate was expected to affect the unevenness of contrast in the liquid crystal device, almost nearly no unevenness of contrast was found when the flatness of the glass substrate was not greater than 0.05 $\mu m$.

An aperture ratio of the liquid crystal device will subsequently be described. Since the liquid crystal device according to the present invention uses metal electrodes, its aperture ratio tends to become low so that it was apt to provide an extremely dim liquid crystal spatial light modulator. However, the aperture ratio was rendered as large as 45~60% by making the linear width of the metal electrodes as wide as 5~10 $\mu m$ so that it took a similar aperture ratio in comparison with that of the conventional liquid crystal device.

Figure 6:
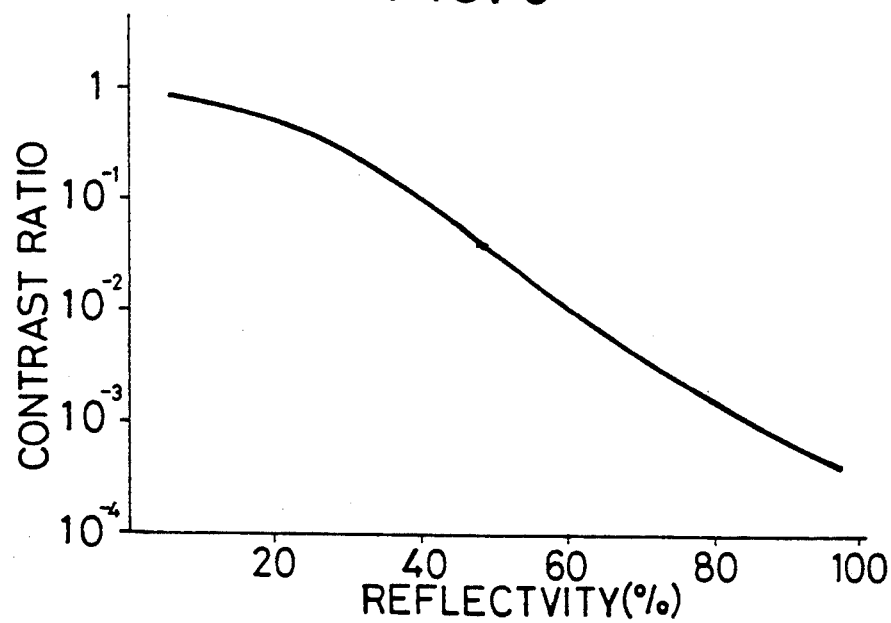
FIG. 6 is a graph illustrating the relation between the reflectivity of the dielectric multilayer film mirror and the contrast ratio of the liquid crystal device.

The relation between the reflectivity and the contrast ratio of the dielectric multilayer film mirror will subsequently be described. FIG. 6 is a graph illustrating the relation between the reflectivity and the contrast ratio of the dielectric multilayer film mirror for use in the liquid crystal device according to the present invention. As is obvious from FIG. 6, the contrast ratio is seen to sharply improve when the reflecivity of the dielectric multilayer film mirror exceeds approximately 60% so that the reflectivity proves satisfactorily usable at over 50%.

As set forth above, the liquid crystal device according to the present invention exhibits a resolution of 10~100 l p/mm at a contrast ratio of 1:100–1:1000 and besides the liquid crystal spatial optical modulator shows the least wavefront distortion after laser beam modulation, whereby it is proved very effective in processing optical data such as image processing and optical computing. In particular, the liquid crystal device according to the present invention is effective in processing optical data on electrically receiving data to be processed and effectively applicable to matched filter using Computer Generated Holograms (CGHs).

What is claimed is:

1. A liquid crystal device comprising:
   a first substrate having a first glass substrate, a first dielectric multilayer film mirror formed on said first glass substrate, a plurality of column electrodes formed on the first dielectric multilayer film mirror, a plurality of first electrodes formed on said first dielectric multilayer film mirror and connected to the column electrodes, and a first alignment layer;
   a second substrate having a second glass substrate, a second dielectric multilayer film mirror formed on said second glass substrate, a plurality of row electrodes formed on the second dielectric multilayer film mirror, a plurality of second electrodes formed on said second dielectric multilayer film mirror and connected to the row electrodes, and a second alignment layer;
   a liquid crystal layer placed between said first and second substrates; and
   wherein the column and row electrodes cross over one another to define a matrix of cross-over points each corresponding to one picture element, each picture element having a pair of opposed pixel electrodes comprised of one of said first electrodes and one of said second electrodes with the liquid crystal layer interposed therebetween, and wherein light transmittance through each picture element depends on an etalon via the liquid crystal layer and is controlled by a voltage applied to the first and second electrodes to effect a change of refractivity of the liquid crystal layer.

2. A liquid crystal device claimed in claim 1; wherein each of said first and second glass substrates has a flatness of 0.05 μm or less.

3. A liquid crystal device claimed in claim 1; wherein each of said first and second electrodes comprises a plurality of transparent electrodes arranged in a matrix, and a plurality of metal electrodes arranged in rows.

4. A liquid crystal device claimed in claim 3; wherein each of said transparent electrodes has a picture element electrode and a junction electrode, and each of said metal electrodes is connected to a row of said picture element electrodes through said junction electrodes.

5. A liquid crystal device claimed in claim 1 further comprising gap control means for forming a gap between said first and second substrates uniformly.

6. A liquid crystal device claimed in claim 5; wherein said gap control means comprise a plurality of minute insulating films formed on an inner face of at least one of said first glass substrate and said second glass substrate.

7. A liquid crystal device claimed in claim 1; wherein said liquid crystal layer comprises one of ferroelectric liquid crystal composition and TN liquid crystal composition.

8. A liquid crystal device claimed in claim 6; wherein said liquid crystal layer comprises ferroelectric liquid crystal composition.

9. A liquid crystal device claimed in claim 1; wherein each of said first and second dielectric multilayer film mirrors has a reflectivity of 50% or more.

10. A liquid crystal device comprising: first and second glass substrates having a liquid crystal material interposed therebetween; first and second dielectric multilayer film mirrors on respective inner surfaces of the substrates to effect a Fabry-Perot etalon via the liquid crystal; a plurality of first pixel electrodes on the first dielectric multilayer film mirror; a plurality of second pixel electrodes on the second dielectric multilayer film mirror, the second pixel electrodes being opposed to respective first pixel electrodes with the liquid crystal material interposed therebetween to define a column-by-row matrix of picture elements; and means for selectively applying voltage to the opposed first and second pixel electrodes of each picture element to effect a change of refractivity of the liquid crystal material of each picture element.

11. The liquid crystal device as claimed in claim 10, wherein each of said first and second glass substrates has a flatness of 0.05 μm or less.

12. The liquid crystal device as claimed in claim 10, further comprising means forming a uniform gap between said first and second substrates.

13. The liquid crystal device as claimed in claim 12, wherein said means forming the gap comprises a plurality of minute insulating films formed between said first glass substrate and said second glass substrate.

14. The liquid crystal device as claimed in claim 13, wherein the liquid crystal is composed of a ferroelectric liquid crystal composition.

15. The liquid crystal device as claimed in claim 10, wherein the liquid crystal is composed of one of a ferroelectric liquid crystal composition and a TN liquid crystal composition.

16. The liquid crystal device as claimed in claim 10, wherein each dielectric multilayer film mirror has a reflectivity of at least 50%.

17. The liquid crystal device as claimed in claim 10, wherein the means for selectively applying voltage comprises a plurality of column electrodes each connected to a respective column of first pixel electrodes, and a plurality of row electrodes each connected to a respective row of second pixel electrodes.

18. The liquid crystal device as claimed in claim 17, wherein the column electrodes are disposed on the first dielectric multilayer film mirror and the row electrodes are disposed on the second dielectric multilayer film mirror.

19. The liquid crystal device as claimed in claim 17, wherein the first pixel electrodes and the column electrodes are formed on the first dielectric multilayer film in non-overlapping relation, and junction electrodes connect the first pixel electrode and the column electrode of each picture element, and wherein the second pixel electrodes and the row electrodes are formed on the second dielectric multilayer film in non-overlapping relation, and junction electrodes connect the second pixel electrode and the row electrode of each picture element.

* * * * *